United States Patent
Choi et al.

(10) Patent No.: US 12,373,684 B2
(45) Date of Patent: Jul. 29, 2025

(54) METHOD OF SPLITTING AND RE-CONNECTING NEURAL NETWORKS FOR ADAPTIVE CONTINUAL LEARNING IN DYNAMIC ENVIRONMENTS

(71) Applicant: INHA-INDUSTRY PARTNERSHIP INSTITUTE, Incheon (KR)

(72) Inventors: Dongwan Choi, Incheon (KR); Jongyeong Kim, Incheon (KR)

(73) Assignee: INHA-INDUSTRY PARTNERSHIP INSTITUTE, Incheon (KR)

( * ) Notice: Subject to any disclaimer, the term of this patent is extended or adjusted under 35 U.S.C. 154(b) by 1022 days.

(21) Appl. No.: 17/382,947

(22) Filed: Jul. 22, 2021

(65) Prior Publication Data

US 2022/0164649 A1    May 26, 2022

(30) Foreign Application Priority Data

Nov. 25, 2020  (KR) .................. 10-2020-0159714

(51) Int. Cl.
*G06N 3/08* (2023.01)
*G06N 3/045* (2023.01)

(52) U.S. Cl.
CPC ............. *G06N 3/08* (2013.01); *G06N 3/045* (2023.01)

(58) Field of Classification Search
CPC .......... G06N 3/08; G06N 3/045; G06N 3/082
See application file for complete search history.

(56) References Cited

U.S. PATENT DOCUMENTS

| 2018/0357539 A1* | 12/2018 | Hwang | ............. G06N 3/04 |
| 2020/0250480 A1* | 8/2020 | Qian | ............. G06N 3/08 |
| 2021/0182600 A1* | 6/2021 | Yu | ............. G06N 5/022 |

FOREIGN PATENT DOCUMENTS

| KR | 10-2019-0117713 | 10/2019 |
| KR | 10-2020-0062743 | 6/2020 |
| WO | 2018156942 A1 | 8/2018 |

OTHER PUBLICATIONS

G.-M. Park, S.-M. Yoo and J.-H. Kim, "Convolutional Neural Network With Developmental Memory for Continual Learning" in IEEE Transactions on Neural Networks and Learning Systems, vol. 32, No. 6, pp. 2691-2705, Jul. 2020 (Year: 2020).*

Kim, Jong-Yeong et al. "Split-and-Bridge: Adaptable Class Incremental Learning within a Single Neural Network," Proceedings of the AAAI Conference on Artificial Intelligence, vol. 35, No. 9, Jul. 3, 2021, pp. 8137-8145.

* cited by examiner

*Primary Examiner* — Kamran Afshar
*Assistant Examiner* — Simon Fischer Ellis
(74) *Attorney, Agent, or Firm* — MH2 TECHNOLOGY LAW GROUP LLP

(57) ABSTRACT

Disclosed is a method of splitting and reconnecting neural networks for adaptive continual learning in dynamic environments. A continual learning method of a neural network model includes a split phase for independently learning a split neural network model using an old task and a new task, and a bridge phase for reconnecting the independently learnt split neural network model and learning relation information between the old task and the new task.

7 Claims, 13 Drawing Sheets

(a) Intra-new (CIFAR-100)

(b) Intra-old (CIFAR-100)

(c) Intra-new (Tiny-ImageNet)

METHOD OF SPLITTING AND RE-CONNECTING NEURAL NETWORKS FOR ADAPTIVE CONTINUAL LEARNING IN DYNAMIC ENVIRONMENTS

CROSS-REFERENCES TO RELATED APPLICATIONS

This application is based on and claims priority under 35 U.S.C. 119 to Korean Patent Application No. 10-2020-0159714, filed on Nov. 25, 2020 in the Korean intellectual property office, the disclosures of which are herein incorporated by reference in their entireties.

TECHNICAL FIELD

The following description relates to a split and reconnection learning technology for a neural network model.

This work was supported in part by the National Research Foundation of Korea (NRF) grant funded by the Korea government (MSIT) (No. 2021R1F1A1060160) (30%), and in part by Institute of Information & communications Technology Planning & Evaluation (IITP) grants funded by the Korea government (MSIT) (No. 2019-0-00240, Deep Partition-and-Merge: Merging and Splitting Deep Neural Networks on Smart Embedded Devices for Real Time Inference (40%), No. 2019-0-00064, Intelligent Mobile Edge Cloud Solution for Connected Car (20%), and No. 2020-0-01389, Artificial Intelligence Convergence Research Center (Inha University) (10%)).

BACKGROUND OF THE INVENTION

Continual learning for a neural network model is one of fields on which research is actively carried out. Continual learning has an object of learning a model capable of better learning all tasks learnt without an information loss for an old task by learning sequentially arriving tasks, unlike learning all tasks to be learnt by a common neural network model at a time. Continual learning for the neural network model is basically divided into task incremental learning and class incremental learning. The task incremental learning assumes that task information is known upon inference by learning a separate independent classifier with respect to each of tasks that are sequentially learnt. In contrast, in the class incremental learning, one unified classifier is learnt with respect to all tasks to be learnt, and a relation between the tasks needs to be distinguished upon learning. The class incremental learning means a continual learning situation in which a unified neural network classifier (unified classifier) is learnt with respect to all tasks by using a given number of classes as a task unit. A relation between the tasks needs to be learnt.

In continual learning of a neural network model, one of methods of overcoming information of an old task loss (catastrophic forgetting) is a rehearsal method. The rehearsal method is a method of storing some of old task data and using them for learning along with new task data. In particular, the method is used as an essential method in class incremental learning in which a relation between tasks needs to be learnt.

A knowledge distillation-based continual learning method is a method of considering, as a teacher model, a model learnt with respect to an old task and allowing a student model that learns a new task using a prediction result value of a teacher model to learn the new task simultaneously when maintaining information on the old task. This method is a useful method of delivering information by using information on a model that has learnt an old task in a situation in which data for the old task is not present or some of the data is present. The knowledge distillation-based scheme continual learning is an effective method in maintaining old task information, but underestimates the importance of new task information learning.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In the existing knowledge distillation-based continual learning, knowledge distillation is used along with new task learning by using a model that has learnt an old task as an initialization model. In this case, knowledge distillation-based learning acts stronger than the new task learning. In knowledge distillation, a neural network model does not additionally learn new information, but has an intention of maintaining new information without any change. Furthermore, the reason for this is that learning is performed using a prediction result value of a teacher model having more information a new task learnt through data. Accordingly, there is a problem in that there is a difficulty in new task learning due to the interference of knowledge distillation for information maintenance for an old task.

An embodiment is to propose a method capable of more effectively learning a new task while maintaining old task information through a learning method of reducing the interference of the two types of contradicting learning.

In one aspect, a continual learning method of a neural network model may include a split phase for independently learning a split neural network model using an old task and a new task, and a bridge phase for reconnecting the independently learnt split neural network model and learning relation information between the old task and the new task.

The split phase may include transforming a neural network model given at sequential timing "t" into a split neural network model consisting of a shared lower layer and a plurality of separated upper layers and performing split learning through a first loss function for performing split learning on a network of the transformed split neural network model.

The split phase may include performing, on the split neural network model, learning for maintaining information of the old task in a way that a portion of the shared lower layer and a portion separated for the old task follow a distribution of prediction result values of a neural network model, related to timing information prior to preset timing, through a second loss function obtained using some of new task data and old task data.

The split phase may include enabling the portion of the shared lower layer and the portion separated for the new task to perform learning on information of the new task through a third loss function obtained using the new task data with respect to the split neural network model.

The split phase may include generating the neural network model into a partially split structure by using a method of making an interconnection weight between the plurality of separated upper layers a value close to 0 while learning the old task and the new task.

The split phase may include dividing all nodes, constituting the split neural network model, into an input node and output node for the old task and an input node and output node for the new task, and splitting the neural network model by breaking connections between the divided input node for the old task and the divided output node for the old task or the divided input node for the new task and the divided output node for the new task.

The split phase may include allocating a last layer node of the split neural network model depending on the old task or the new task, and adjusting a ratio that nodes are allocated to each group in order to allocate nodes except the last layer in proportion to the number of classes belonging to each group.

The bridge phase may include reconnecting a plurality of upper layers separated from the independently learnt split neural network model in order to learn the relation information between the old task and the new task, and learning the relation information.

The bridge phase may include generating an interconnection weight removed in the split phase so that the interconnection weight has a preset initialization value, and performing reconnection learning through a fourth loss function in order to learn the relation information between the old task and the new task.

The bridge phase may include performing learning on common information between the learnt old task and new task and old task information learnt through one of the plurality of separated upper layers through a fifth loss function obtained using some of new task data and old task data, in a shared lower layer with respect to the split neural network model having prediction result values of a portion of the shared lower layer and a portion separated for the old task with respect to the split neural network model.

The bridge phase may include performing learning on the relation information between the old task and the new task through a sixth loss function obtained using some of the new task data and the old task data.

In one aspect, a continual learning system of a neural network model may include a split phase unit configured to independently learn a split neural network model using an old task and a new task, and a bridge phase unit configured to reconnect the independently learnt split neural network model and to learn relation information between the old task and the new task.

In a situation in which a convolutional neural network model performs continual learning, a new task can be more effectively learnt while maintaining old task information by splitting and reconnecting a single neural network model.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

In an embodiment, an operation of more effectively learning a new task, while maintaining information on an old task, by using a method of splitting and reconnecting a single neural network model in a situation in which a convolutional neural network model performs continual learning is described. Continual learning means learning having an object of better inferring all learnt tasks by learning sequentially arriving tasks without storing old task data.

To this end, an operation using a learning method of splitting some of the neural network model into an old task portion and a new task portion and reducing mutual interference between pieces of different task learning by using an independent loss function for each task is described. Furthermore, an operation of reconnecting and learning a neural network model split in order to learn a relation between tasks is described. As a result of the execution of continual learning performance evaluation using the learning method proposed in an embodiment, it can be seen that overall performance has been improved through effective learning for a new task while maintaining performance of an old task.

Figure 1:
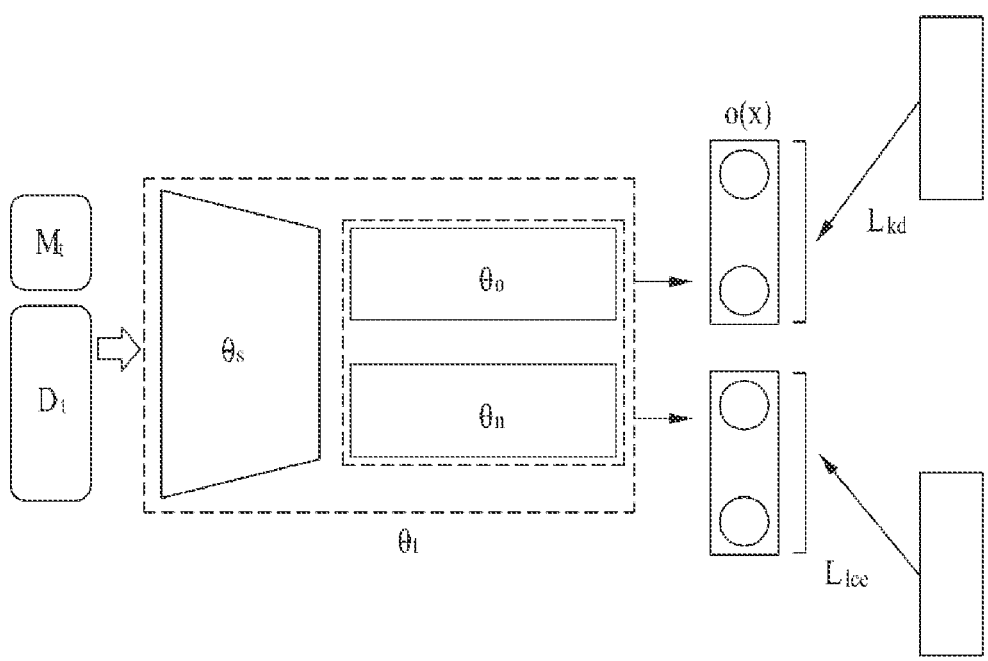
FIG. 1 is a diagram for describing a split learning operation in a continual learning system according to an embodiment.
Figure 2:
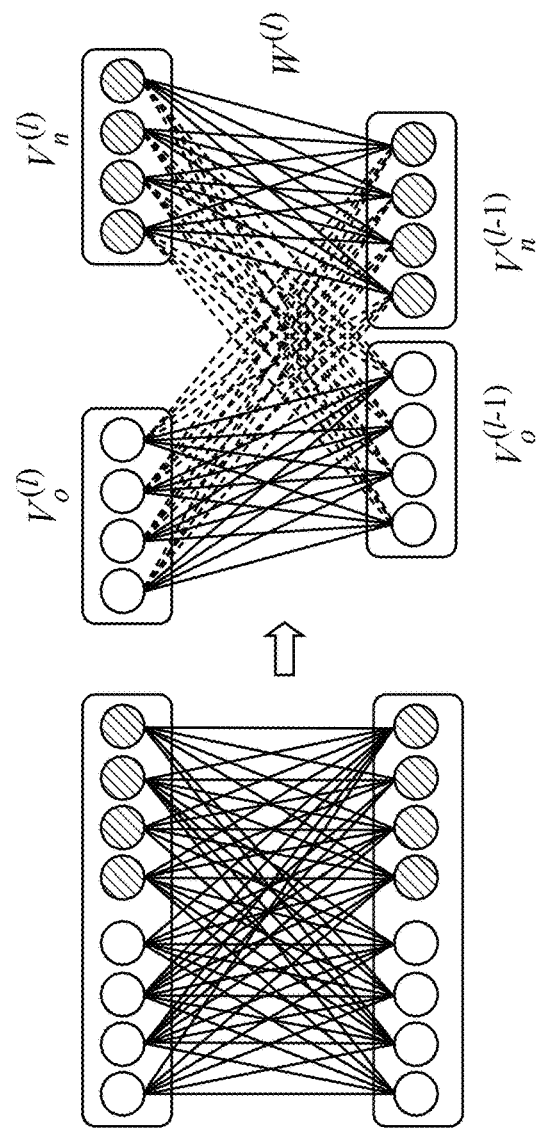
FIG. 2 is a diagram for describing a split learning operation in a continual learning system according to an embodiment.
Figure 2:
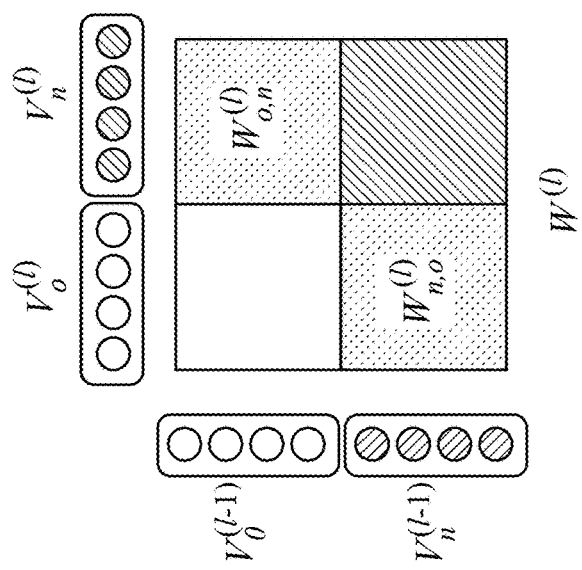

FIGS. 1 and 2 are diagrams for describing a split learning operation in a continual learning system according to an embodiment.

Split learning of a single neural network model is described with reference to FIG. 1. The single neural network model has an object of learning new task information as much as possible along with information maintenance learning for an old task. An old task means all tasks learnt prior to current timing at which learning is performed in a continual learning process. A new task means a task learnt at current timing in a continual learning process.

To this end, a neural network model $\theta_t$ given at sequential timing t is returned as a neural network model $\langle \theta_s, [\theta_o, \theta_n] \rangle_t$ consisting of a shared lower layer $\theta_s$ and two split upper layers $\theta_o$, $\theta_n$ as in FIG. 1. Furthermore, learning is performed on a network of a single neural network model through the following loss function.

$$\mathcal{L}_{kd}(D_t \cup M_t, \langle \theta_s, \theta_o \rangle_t) + \mathcal{L}_{lce}(D_t, \langle \theta_s, \theta_n \rangle_t)$$

Learning for maintaining old task information is performed in a way that a shared portion and a portion $\langle \theta_s, \theta_o \rangle_t$ separated for an old task follow a distribution of prediction result values of a model $\theta_{t-1}$ through $\mathcal{L}_{kd}$ obtained using some samples $M_t$ of new task data $D_t$ and old task data. Furthermore, the shared portion and a portion $\langle \theta_s, \theta_n \rangle_t$ separated for a new task learn new task information through $\mathcal{L}_{lce}$ obtained using the new task data $D_t$. $\mathcal{L}_{lce}$ is a loss function using only a local probability between classes that belong to the new task in order to learn only relation information within the new task.

$$\mathcal{L}_{ice}(D_t, \theta) = \sum_{(x,y) \in D_t} y_t \log p_t(x)$$

A softmax value $p_t(x)$ calculated using only sub-logit, that is, the output of classes corresponding to a task t, and a distribution of classes belonging to the task t calculated using a label $y_t$ belonging to the task t are learnt. Accordingly, the two learning processes for the old and new tasks are performed on $\theta_s$ in common, but are independently performed on $\theta_o$ and $\theta_n$.

Learning for a network split is described with reference to FIG. 2. While the old task and the new task are learnt in order to generate the neural network model $\theta_t$ in a partially split structure $\langle \theta_s, [\theta_o, \theta_n] \rangle_t$, a method of making an interconnection weight between $\theta_o$ and $\theta_n$ a value closest to 0 is used. As illustrated in FIG. 2, $W^{(l)}$ indicates a weight matrix of a layer l, $v^{(l-1)}$ may be indicated as an input node of the layer l, and $v^{(l)}$ may be indicated as an output node of the layer l. To split $W^{(l)}$ is to divide $v^{(l-1)}$, that is, the input node, and $v^{(l)}$, that is, the output node, into two exclusive groups at a constant ratio and to break a mutual connection between the two groups. Accordingly, all the nodes are divided into $v_o^{(l-1)}$, $v_o^{(l)}$ for the old task and $v_n^{(l-1)}$, $v_n^{(l)}$ for the new task. Furthermore, the neural network model is split by breaking the connection between $v_o^{(l-1)}$ and $v_n^{(l)}$ or $v_n^{(l-1)}$, $v_n^{(l)}$ To this end, the neural network model is split through the following equation.

$$\mathcal{L}_{kd}(D_t \cup M_t, \theta_t) + \mathcal{L}_{ice}(D_t, \theta_t) + \gamma \sum_{l=s+1}^{L} (\|W_{o,n}^{(l)}\|_2 + \|W_{n,o}^{(l)}\|_2)$$

$W_{o,n}^{(l)}$, $W_{n,o}^{(l)}$ indicate interconnection weight values that need to be disconnected. The neural network model $\theta_t$ learns the old task and the new task through $\mathcal{L}_{kd}$, $\mathcal{L}_{ice}$, and a weight that needs to be disconnected is produced into a value closest to 0 through a regularization term. In the regularization term, l2 norm is added to the weights $W_{o,n}^{(l)}$, $W_{n,o}^{(l)}$ to be disconnected. In order to minimize a loss function value, all weights are learnt to equally become 0. Furthermore, regulation strength is adjusted through $\gamma$. If the learning for the split is sufficiently performed, the neural network model is split by completely removing a mutual connection weight.

Thereafter, an allocation ratio of nodes may be adjusted. A group allocation ratio for the nodes of the neural network model is allocated depending on whether the last layer node is an old task or a new task. However, in order to allocate nodes except the last layer in proportion to the number of classes belonging to each group every continual learning process, a ratio of the number of nodes allocated per group is determined according to the following equation.

$$|v_o^{(l)}| : |v_n^{(l)}| = \rho C_{old} : (1-\rho) C_{old} + C_{new}$$

$\rho$ is a hyper meter that adjusts a node allocation ratio for an old task. In this case, if the number of nodes allocated to a new task group becomes 1 or less as in $|v_n^{(l)}| < 1$, a learning layer for the old task and the new task is shared.

Figure 3:
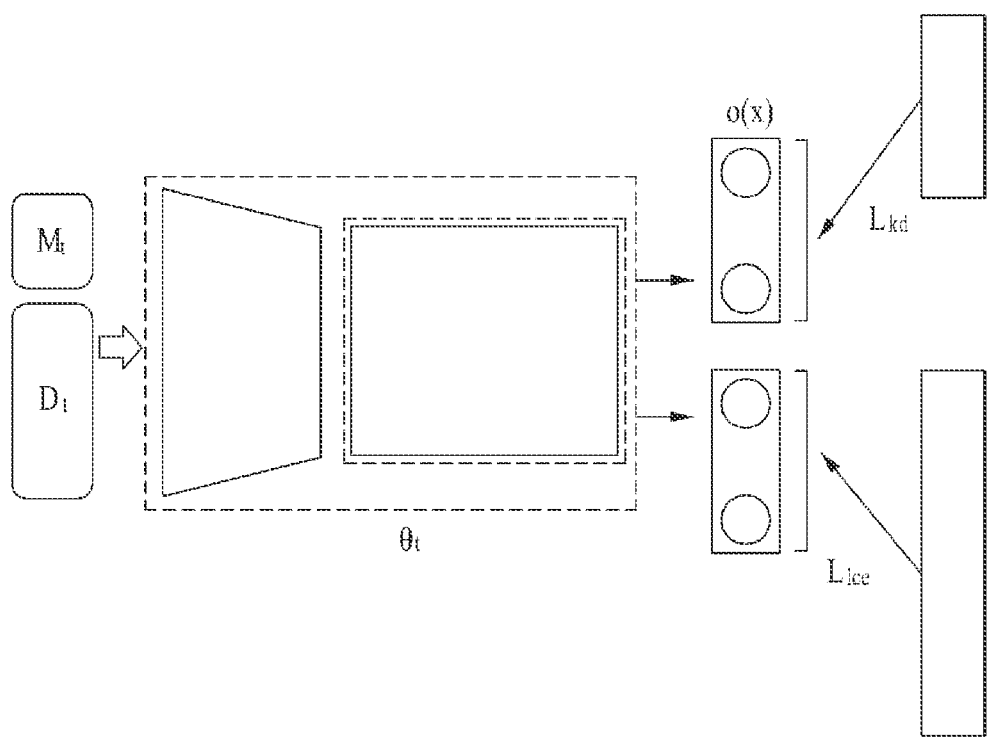
FIG. 3 is a diagram for describing a reconnection learning operation in the continual learning system according to an embodiment.
Figure 4A:
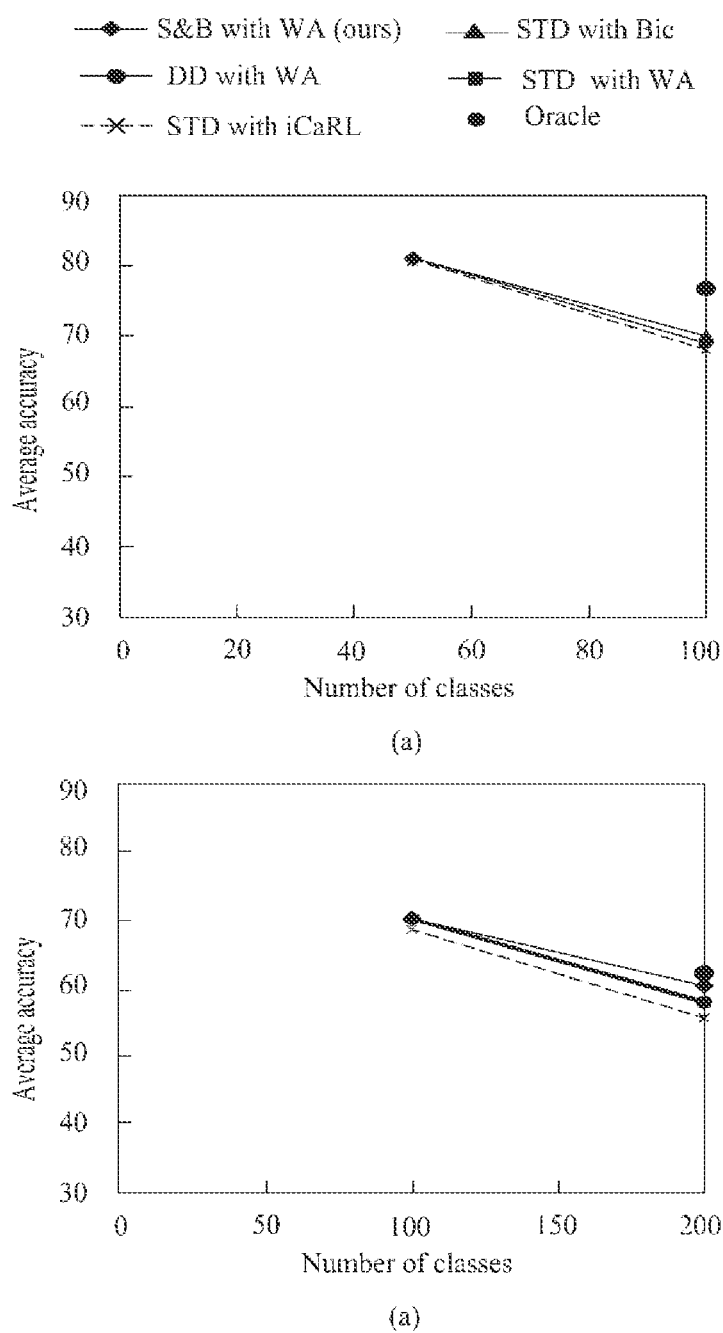
FIG. 4A is a graph illustrating a comparison between pieces of continual learning performance in the continual learning system according to an embodiment.
Figure 4B:
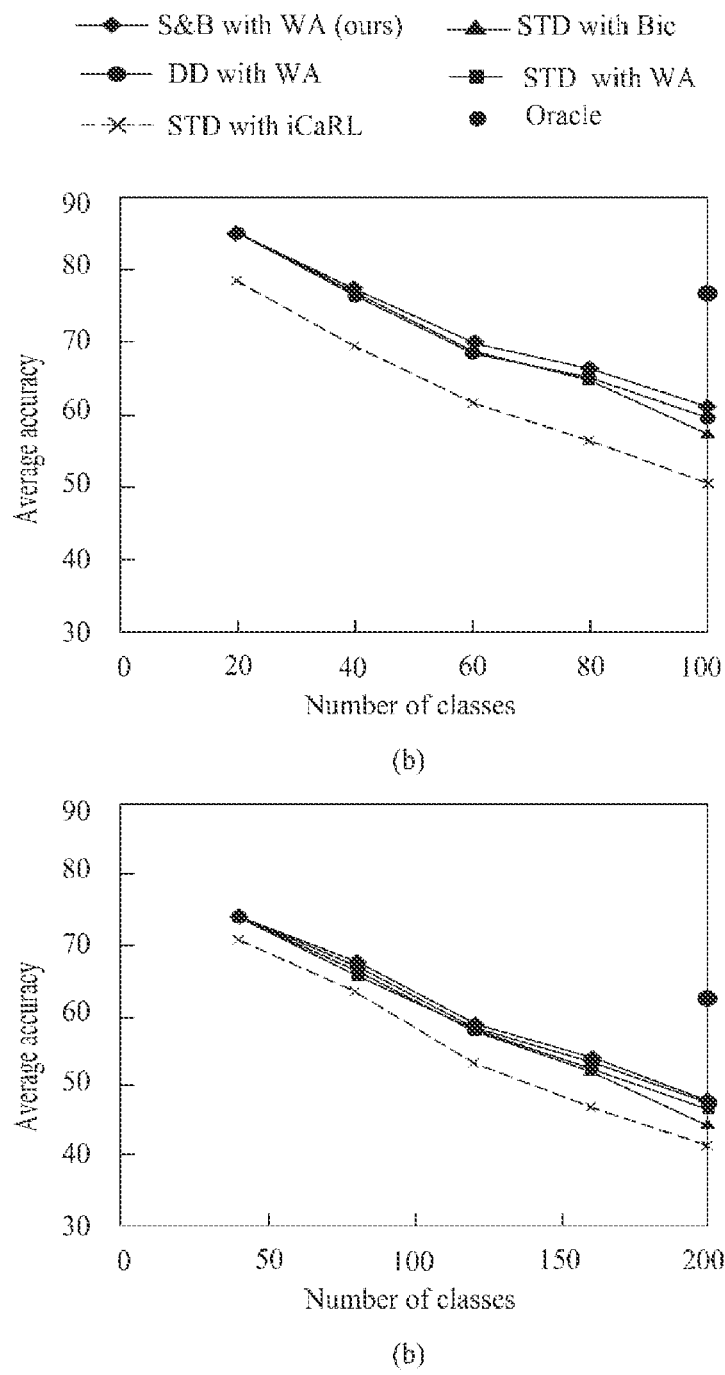
FIG. 4B is a graph illustrating a comparison between pieces of continual learning performance in the continual learning system according to an embodiment.
Figure 4C:
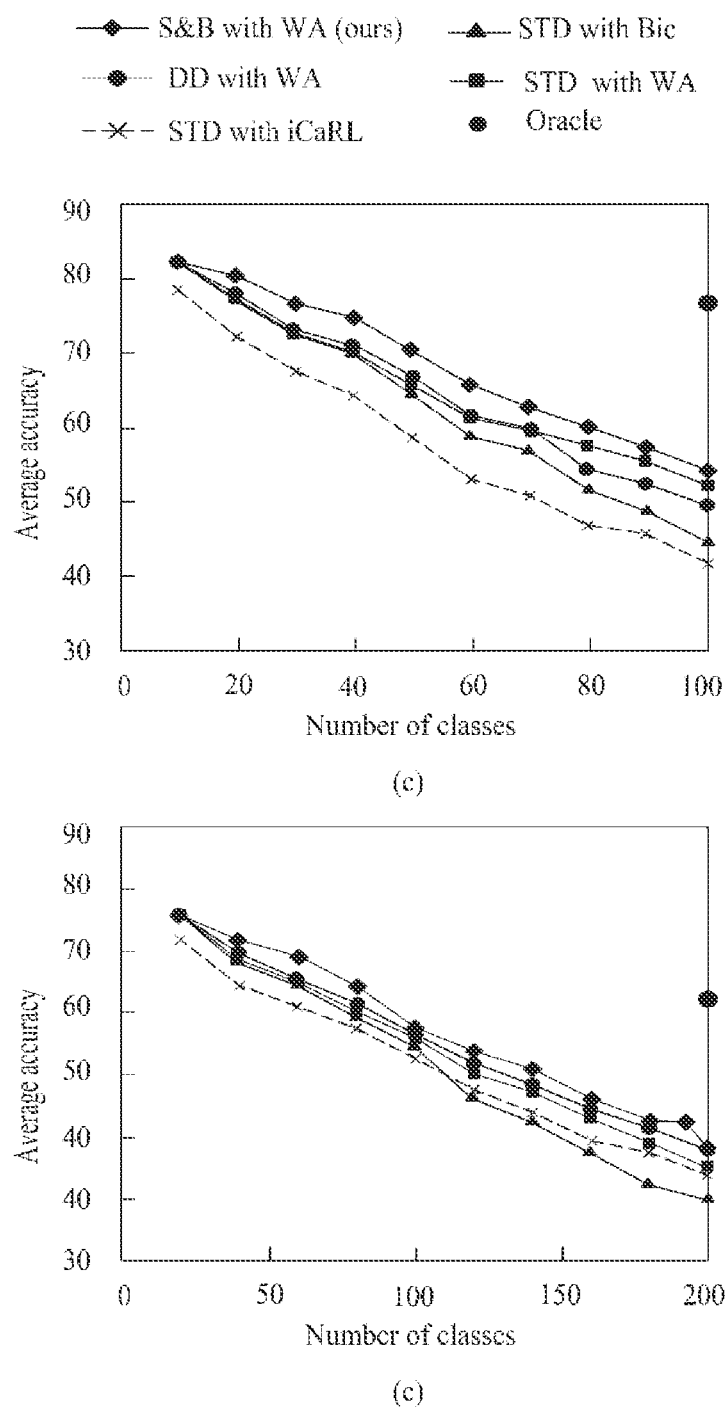
FIG. 4C is a graph illustrating a comparison between pieces of continual learning performance in the continual learning system according to an embodiment.
Figure 4D:
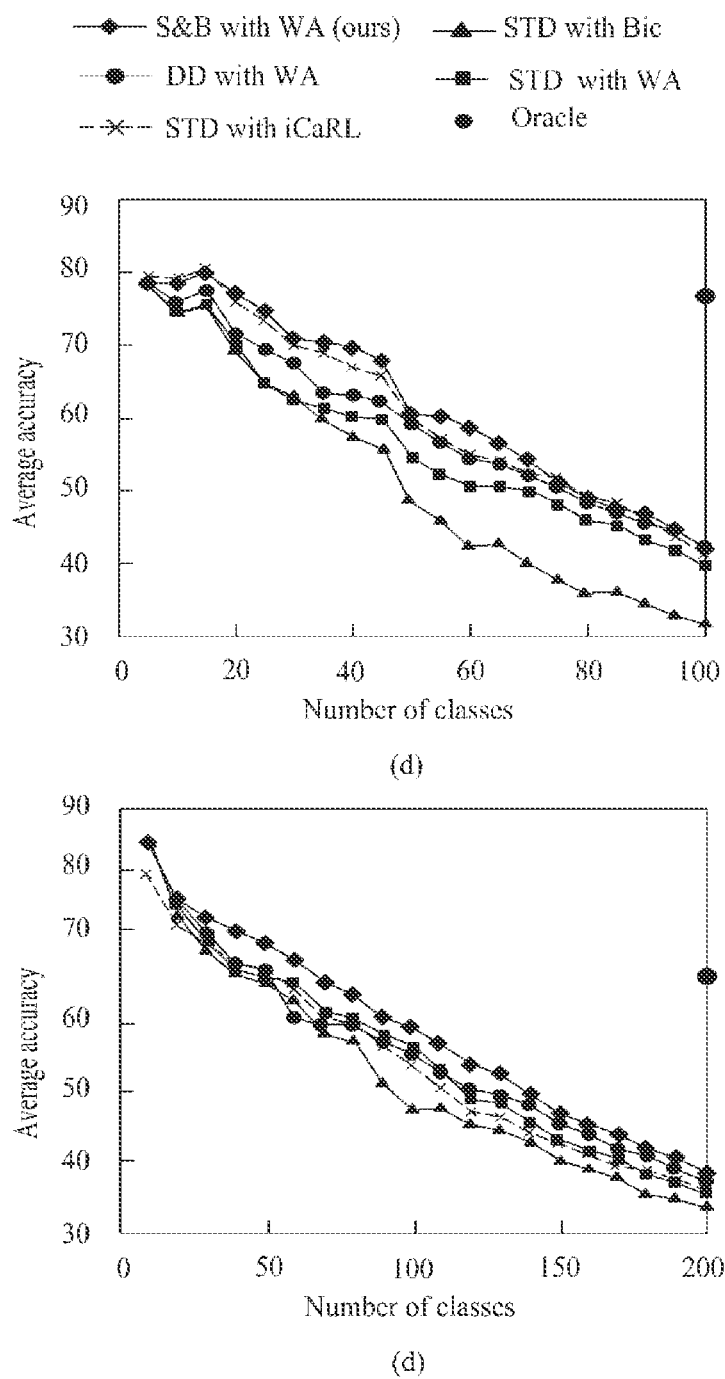
FIG. 4D is a graph illustrating a comparison between pieces of continual learning performance in the continual learning system according to an embodiment.
Figure 5A:
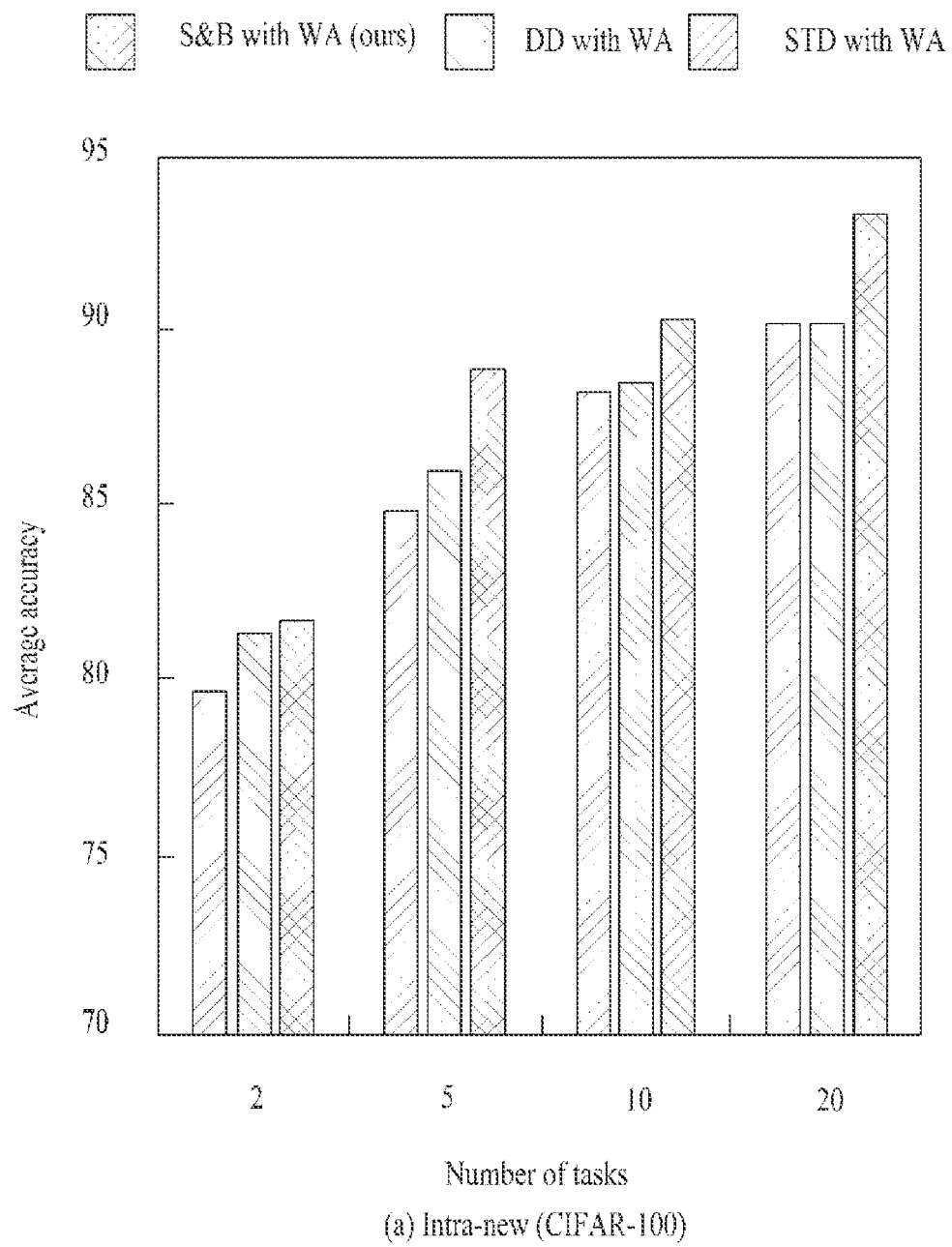
FIG. 5A is a graph illustrating a comparison between pieces of continual learning performance in the continual learning system according to an embodiment.
Figure 5B:
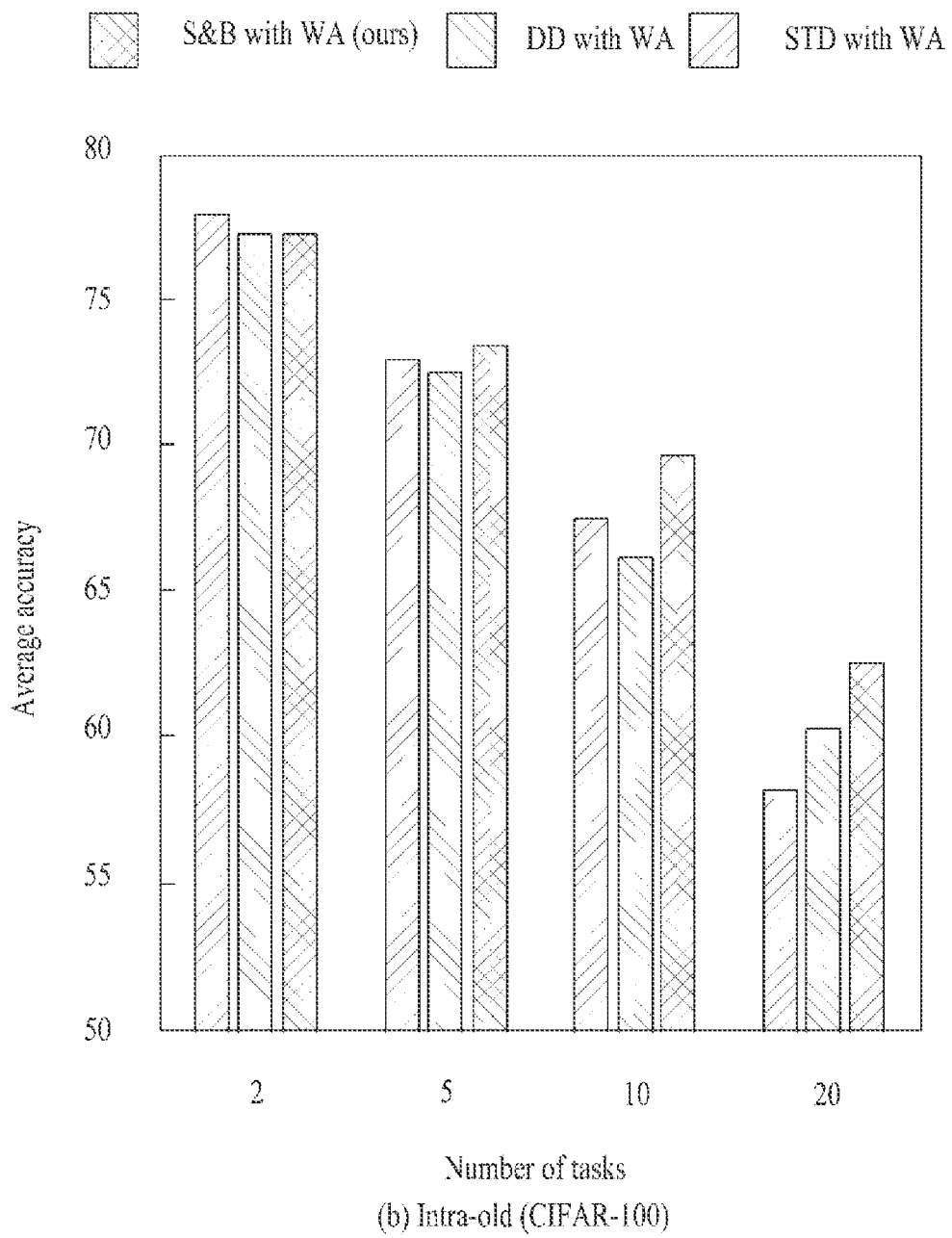
FIG. 5B is a graph illustrating a comparison between pieces of continual learning performance in the continual learning system according to an embodiment.
Figure 5C:
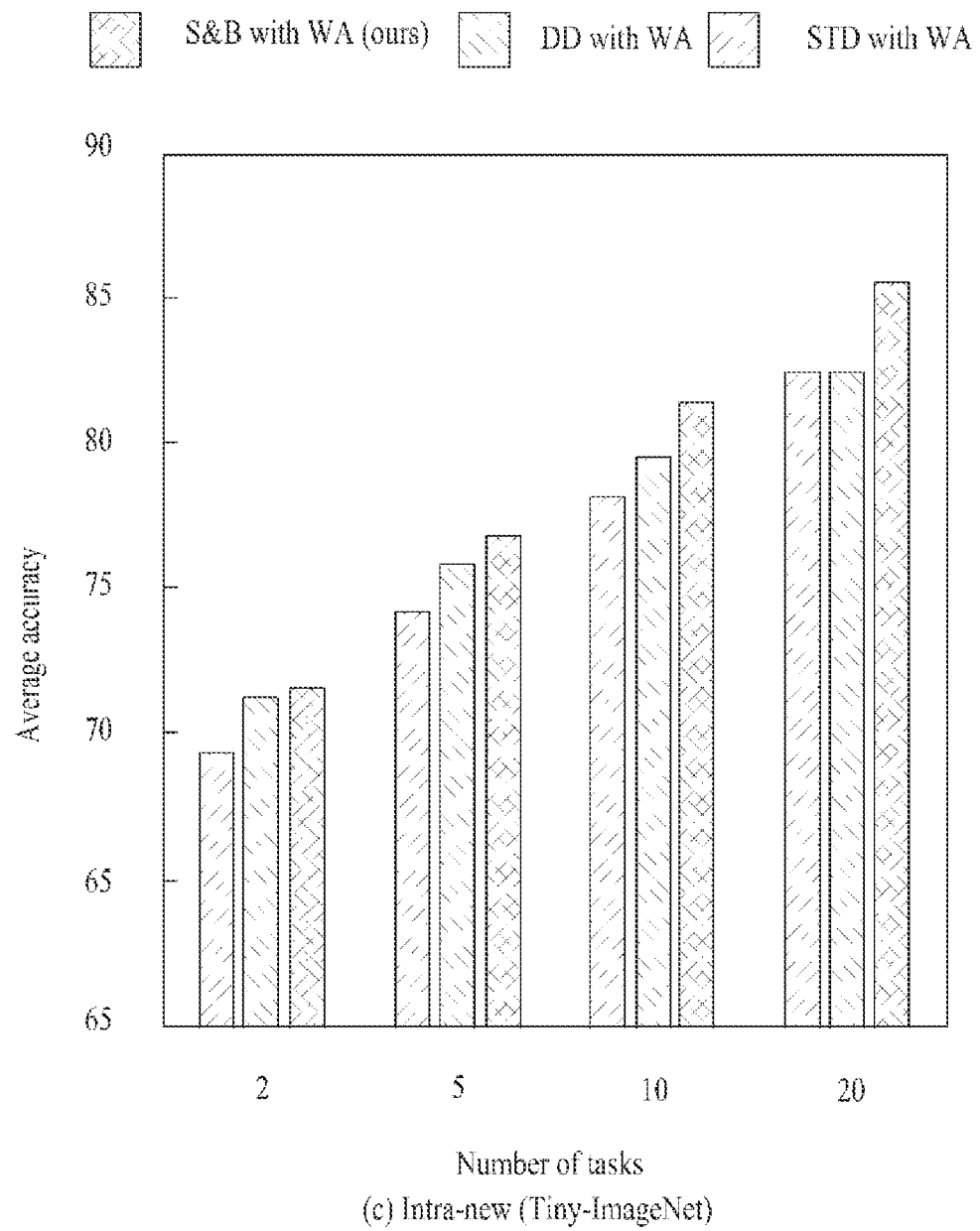
FIG. 5C is a graph illustrating a comparison between pieces of continual learning performance in the continual learning system according to an embodiment.
Figure 5D:
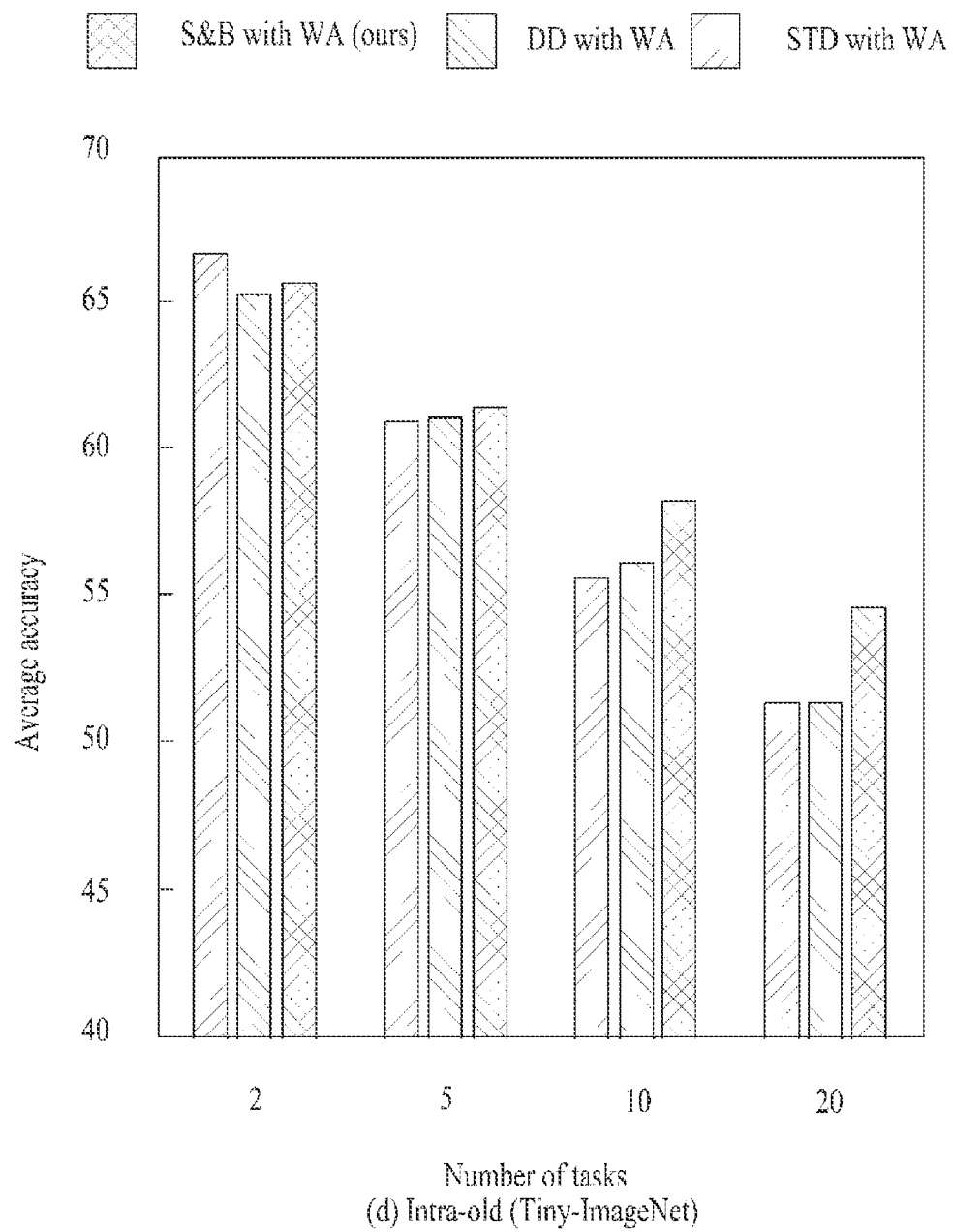
FIG. 5D is a graph illustrating a comparison between pieces of continual learning performance in the continual learning system according to an embodiment.

FIG. 3 is a diagram for describing a reconnection learning operation in the continual learning system according to an embodiment.

In order for the neural network model $\langle \theta_s, [\theta_o, \theta_n] \rangle_t$ independently split and learnt with respect to an old task and a new task to learn relation information between the tasks, as in FIG. 3, two split portions $\theta_o$, $\theta_n$ are reconnected and learnt. To this end, a weight removed in the split learning process is produced to have an initialization value of 0. Furthermore, in order to learn information between the tasks, learning is performed through the following loss function. Information between the tasks (cross task knowledge) means information learnt to distinguish between classes belonging to different tasks.

$$\lambda \mathcal{L}_{kd}(D_t \cup M_t, \theta_t) + (1-\lambda) \mathcal{L}_{ce}(D_t \cup M_t, \theta_t)$$

Common information between the old task and the new task learnt in $\theta_s$ of a prediction result value for $\langle \theta_s, \theta_o \rangle_t$ and old task information learnt through $\theta_o$ are learnt through $\mathcal{L}_{kd}$ obtained using some samples $M_t$ of the new task data $D_t$ and the old task data. Relation information between the old task and the new task is learnt through $\mathcal{L}_{ce}$ obtained using some samples $M_t$ of the new task data $D_t$ and the old task data.

As described above, the method proposed in an embodiment handles a problem in class incremental learning in which information between tasks also needs to be learnt along with intra task knowledge. In this case, the intra task knowledge means information learnt in order to distinguish between classes belonging to a task. For example, intra-old task knowledge and new intra task knowledge may be included in the intra task knowledge.

FIGS. 4 and 5 are graphs illustrating a comparison between pieces of continual learning performance in the continual learning system according to an embodiment.

Table 1 illustrates results of a comparison between pieces of continual learning performance for two data sets in the existing knowledge distillation-based continual learning method and the continual learning method through a split and reconnection proposed in an embodiment. Performance of continual learning is the results of average accuracy obtained by dividing all data sets in a task unit consisting of a given number of classes and sequentially learning and measuring these tasks. As a result of experiments, it can be seen that the method proposed in an embodiment usually shows higher average accuracy than the existing knowledge distillation-based schemes.

TABLE 1

| Number of tasks | 2 | 5 | 10 | 20 |
|---|---|---|---|---|
| CIFAR-100 | | | | |
| STD with iCaRL | 68.14 | 59.50 | 55.6 | 60.04 |
| STD with Bic | 69.96 | 67.07 | 60.65 | 49.89 |
| STD with WA | 69.28 | 67.64 | 63.72 | 55.29 |
| DD with WA | 68.84 | 67.68 | 63.12 | 58.08 |
| S&B with WA (ours) | 69.6 | 68.62 | 66.97 | 61.12 |
| Oracle | | | 77.03 | |
| Tiny-ImageNet | | | | |
| STD with iCaRL | 55.72 | 51.32 | 48.65 | 46.56 |
| STD with Bic | 58.16 | 55.23 | 48.47 | 43.81 |
| STD with WA | 57.96 | 55.97 | 51.61 | 47.57 |
| DD with WA | 58.33 | 56.80 | 53.12 | 48.14 |
| S&B with WA (ours) | 60.52 | 57.16 | 54.81 | 51.63 |
| Oracle | | | 62.35 | |

Furthermore, FIG. 4 is results illustrating, as a graph, accuracy of each split phase and bridge phase of continual learning. From FIG. 4, it can be seen that accuracy in each phase is mostly high in addition to average accuracy.

FIG. 5 is experiment results illustrating a comparison between old task learning performance and new task learning performance in continual learning experiments. From FIG. 5, it can be seen that the method proposed in an embodiment has improved performance of the new task while maintaining information on the old task.

Figure 6:
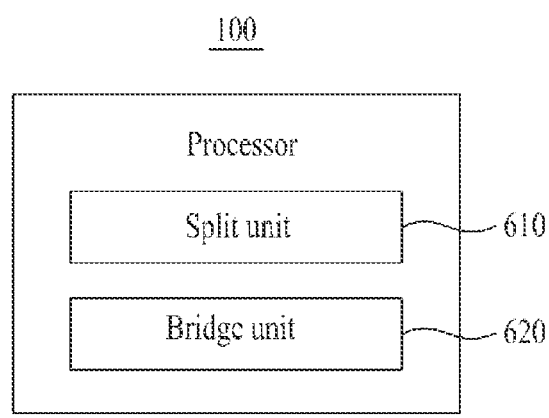
FIG. 6 is a block diagram for describing a configuration of the continual learning system according to an embodiment.
Figure 7:
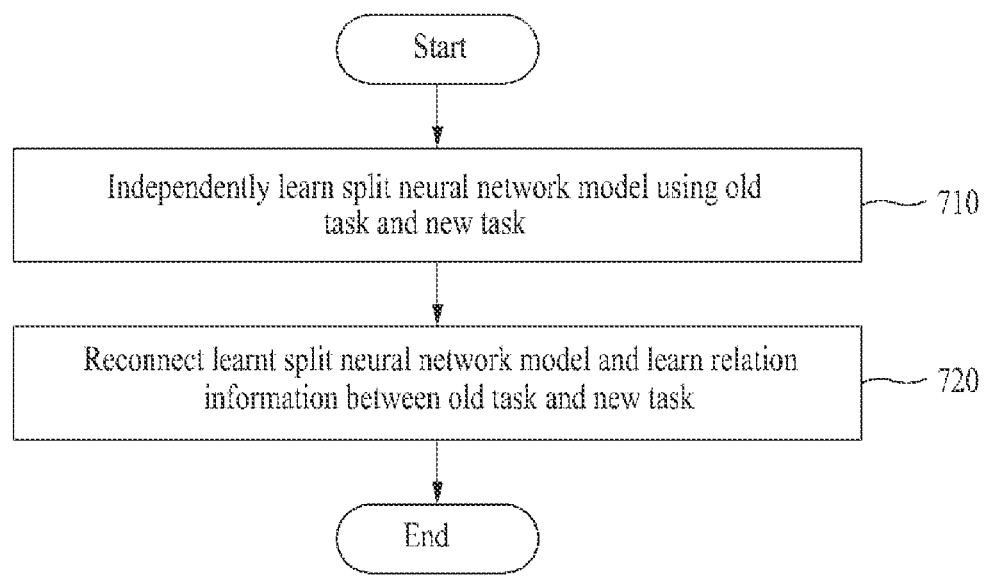
FIG. 7 is a flowchart for describing a continual learning method in the continual learning system according to an embodiment.

FIG. 6 is a block diagram for describing a configuration of the continual learning system according to an embodiment. FIG. 7 is a flowchart for describing a continual learning method in the continual learning system according to an embodiment.

A processor of the continual learning system 100 may include a split unit 610 and a bridge unit 620. Components of the processor may be expressions of different functions performed by the processor in response to a control command provided by a program code stored in the continual learning system. The processor and the components of the processor may control the continual learning system to perform steps 710 to 720 included in the continual learning method of FIG. 7. In this case, the processor and the components of the processor may be implemented to execute instructions based on a code of an operating system and a code of at least one program included in a memory.

The processor may load, onto the memory, a program code stored in a file of a program for the continual learning method. For example, when the program is executed in the continual learning system, the processor may control the continual learning system to load the program code from the file of the program to the memory under the control of the operating system. In this case, the processor, and the split unit 610 and the bridge unit 620 included in the processor may be different functional expressions of a processor for subsequently executing steps 710 to 720 by executing instructions of a portion corresponding to the program code loaded onto the memory.

In step 710, the split unit 610 may independently learn a split neural network model using an old task and a new task. The split unit 610 may transform a neural network model, given at sequential timing "t", into a split neural network model consisting of a shared lower layer and a plurality of separated upper layers, and may perform split learning on a network of the transformed split neural network model through a first loss function for split learning. The split unit 610 may perform, on the split neural network model, learning for maintaining information of the old task in a way that a portion of the shared lower layer and a portion separated for the old task follow a distribution of prediction result values of the neural network model, related to timing information prior to preset timing, through a second loss function obtained using some of new task data and old task data. The split unit 610 may enable the portion of the shared lower layer and the portion separated for the new task to perform learning on information of the new task through a third loss function obtained using the new task data with respect to the split neural network model. In this case, the second loss function and the third loss function may be the same. While performing learning on the old task and the new task, the split unit 610 may generate the neural network model into a partially split structure by using a method of making, a value close to 0, an interconnection weight between a plurality of separated upper layers. The split unit 610 may divide all nodes, constituting the split neural network model, into an input node and output node for the old task and an input node and output node for the new task, and may split the neural network model by breaking connections between the divided input node for the old task and the divided output node for the old task or the divided input node for the new task and the divided output node for the new task. The split unit 610 may allocate the last layer node of the split neural network model depending on the old task or the new task, and may adjust a ratio that nodes are allocated to each group in order to allocate nodes except the last layer in proportion to the number of classes belonging to each group.

In step 720, the bridge unit 620 may reconnect the learnt split neural network model and learn relation information between the old task and the new task. In order to learn the relation information between the old task and the new task, the bridge unit 620 may reconnect the plurality of upper layers separated from the independently learnt split neural network model, and may learn the relation information. The bridge unit 620 may generate the interconnection weight removed in the split phase so that the interconnection weight has a preset initialization value, and may perform reconnection learning through a fourth loss function in order to learn the relation information between the old task and the new task. The bridge unit 620 may perform learning on common information between the learnt old task and new task and old task information learnt through one of the plurality of separated upper layers through a fifth loss function obtained using some of the new task data and the old task data, in a shared lower layer with respect to the split neural network model having prediction result values of the portion of the shared lower layer and the portion separated for the old task with respect to the split neural network model. The bridge unit 620 may perform learning on the relation information between the old task and the new task through a sixth loss function obtained using some of the new task data and the old task data.

The aforementioned apparatus may be implemented as a hardware element, a software element and/or a combination of a hardware element and a software element. For example, the apparatus and components described in the embodiments may be implemented using one or more general-purpose computers or special-purpose computers, for example, a processor, a controller, an arithmetic logic unit (ALU), a digital signal processor, a microcomputer, a field programmable gate array (FPGA), a programmable logic unit (PLU), a microprocessor or any other device capable of executing or responding to an instruction. A processing apparatus may perform an operating system (OS) and one or more software applications executed on the OS. Furthermore, the processing apparatus may access, store, manipulate, process and generate data in response to the execution of software. For convenience of understanding, one processing apparatus has been illustrated as being used, but a person having ordinary knowledge in the art may understand that the processing apparatus may include a plurality of processing components and/or a plurality of types of processing components. For example, the processing apparatus may include a plurality of processors or one processor and one controller. Furthermore, other processing configurations, such as a parallel processor, are also possible.

Software may include a computer program, a code, an instruction or a combination of one or more of them, and may configure a processor so that it operates as desired or may instruct processors independently or collectively. Software and/or data may be embodied in any type of a machine, component, physical device, virtual equipment, or computer storage medium or device so as to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure alone or in combination. The program instructions stored in the medium may be specially designed and constructed for the present disclosure, or may be known and available to those skilled in the field of computer software. Examples of the computer-readable storage medium include magnetic media such as a hard disk, a floppy disk and a magnetic tape, optical media such as a CD-ROM and a DVD, magneto-optical media such as a floptical disk, and hardware devices specially configured to store and execute program instructions such as a ROM, a RAM, and a flash memory. Examples of the program instructions include not only machine language code that is constructed by a compiler but also high-level language code that can be executed by a computer using an interpreter or the like.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The invention claimed is:

1. A continual learning method of a neural network model, performed by a computer system, comprising:
    transforming a convolutional neural network model given at sequential timing "t" into a split neural network model consisting of a shared lower layer ($\theta_s$) and two separated upper layers including a first upper layer ($\theta_o$) and a second upper layer ($\theta_n$);
    performing split learning in which two learning processes for an old task and a new task are performed on the shared lower layer in common, and are independently performed on the first upper layer and the second upper layer, respectively; and
    reconnecting the first upper layer and the second upper layer on the independently learnt split neural network model and learning relation information between the old task and the new task,
    wherein the performing of the split learning comprises:
    performing, on the split neural network model, learning for maintaining information of the old task in a way that a portion of the shared lower layer and a portion of the first upper layer separated for the old task follow a distribution of prediction result values of a neural network model, related to timing information prior to preset timing, using a loss function obtained using new task data and old task data; and
    performing, on the split neural network model, learning on information of the new task in a way that the portion of the shared lower layer and a portion of the second upper layer separated for the new task learn the information of the new task, using a loss function obtained using the new task.

2. The continual learning method of claim 1, wherein the performing of the split learning comprises generating the neural network model into a partially split structure by using a method of making an interconnection weight between the plurality of separated upper layers a value of 0 while learning the old task and the new task.

3. The continual learning method of claim 2, wherein the performing of the split learning comprises:
    dividing all nodes, constituting the split neural network model, into an input node and output node for the old task and an input node and output node for the new task, and
    splitting the neural network model by breaking connections between the divided input node for the old task and the divided output node for the old task or the divided input node for the new task and the divided output node for the new task.

4. The continual learning method of claim 1, wherein the reconnecting comprises:
    generating an interconnection weight removed in the performing split learning phase so that the interconnection weight has a preset initialization value, and
    performing reconnection learning through a loss function in order to learn the relation information between the old task and the new task.

5. The continual learning method of claim 1, wherein the learning of the relation comprises:
    performing learning on common information between the learnt old task and new task and old task information learnt through one of the plurality of separated upper layers through a loss function obtained using the new task and some of the old task data including at least two tasks, in a shared lower layer with respect to the split neural network model having prediction result values of a portion of the shared lower layer and a portion separated for the old task with respect to the split neural network model.

6. The continual learning method of claim 5, wherein the learning of the relation comprises performing learning on the relation information between the old task and the new task through a loss function.

7. A continual learning system of a neural network model, comprising,
at least one a processor configured to:
transform a convolutional neural network model given at sequential timing "t" into a split neural network model consisting of a shared lower layer ($\theta_s$) and two separated upper layers including a first upper layer ($\theta_o$) and a second upper layer ($\theta_n$);
perform split learning in which two learning processes for an old task and a new task are performed on the shared lower layer in common, and are independently performed on the first upper layer and the second upper layer, respectively; and
reconnect the first upper layer and the second upper layer on the independently learnt split neural network model and learn relation information between the old task and the new task,
wherein the processor is configured to perform the split learning by:
performing, on the split neural network model, learning for maintaining information of the old task in a way that a portion of the shared lower layer and a portion of the first upper layer separated for the old task follow a distribution of prediction result values of a neural network model, related to timing information prior to preset timing, using a loss function obtained using new task data and old task data, and
performing, on the split neural network model, learning on information of the new task in a way that the portion of the shared lower layer and a portion of the second upper layer separated for the new task learn the information of the new task, using a loss function obtained using the new task.

* * * * *